US008667526B2

(12) United States Patent
Afram et al.

(10) Patent No.: US 8,667,526 B2
(45) Date of Patent: Mar. 4, 2014

(54) PROVIDING CONTENT RELATED TO AN ITEM IN AN INTERACTIVE DATA SCROLL

(75) Inventors: Andrew J Afram, Somerville, MA (US); D. Beau Morley, Somerville, MA (US); Hannah Y Moon, Boston, MA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 460 days.

(21) Appl. No.: 12/135,826

(22) Filed: Jun. 9, 2008

(65) Prior Publication Data

US 2009/0307721 A1 Dec. 10, 2009

(51) Int. Cl.
| | |
|---|---|
| *H04N 7/173* | (2011.01) |
| *H04N 7/10* | (2006.01) |
| *H04N 7/025* | (2006.01) |
| *G06F 3/00* | (2006.01) |
| *G06F 13/00* | (2006.01) |
| *H04N 5/445* | (2011.01) |
| *H04N 7/20* | (2006.01) |
| *H04N 7/18* | (2006.01) |
| *H04N 7/16* | (2011.01) |

(52) U.S. Cl.
USPC .................. 725/32; 725/24; 725/33; 725/34; 725/35; 725/36; 725/37; 725/38; 725/39; 725/40; 725/41; 725/42; 725/43; 725/44; 725/45; 725/46; 725/47; 725/48; 725/49; 725/50; 725/51; 725/52; 725/53; 725/54; 725/55; 725/56; 725/57; 725/58; 725/59; 725/60; 725/68; 725/85; 725/100; 725/131; 725/135; 725/136; 725/139; 725/151; 715/716; 715/717; 715/718; 715/719; 715/720; 715/721; 715/722; 715/774; 715/821; 715/822; 715/827

(58) Field of Classification Search
USPC .................. 725/24, 32–61, 68, 85, 100, 131, 725/135–136, 139, 151; 715/716–722, 774, 715/821–822, 827
See application file for complete search history.

(56) References Cited

U.S. PATENT DOCUMENTS

| | | | | |
|---|---|---|---|---|
| 5,598,523 | A * | 1/1997 | Fujita | 715/840 |
| 5,850,218 | A * | 12/1998 | LaJoie et al. | 725/45 |
| 6,005,562 | A * | 12/1999 | Shiga et al. | 715/721 |
| 6,177,931 | B1 * | 1/2001 | Alexander et al. | 725/52 |
| 7,774,815 | B1 * | 8/2010 | Allen | 725/80 |
| 2002/0174430 | A1 * | 11/2002 | Ellis et al. | 725/46 |
| 2004/0031061 | A1 * | 2/2004 | McCalla et al. | 725/135 |
| 2006/0259932 | A1 * | 11/2006 | Kim et al. | 725/100 |
| 2008/0255961 | A1 * | 10/2008 | Livesey | 705/27 |

OTHER PUBLICATIONS http://www.plasm.com/rob/portfolio/Blendo/, Apr. 29, 2008 (print date), pp. 1-3.

(Continued)

*Primary Examiner* — Hunter B Lonsberry
*Assistant Examiner* — Yassin Alata

(57) ABSTRACT

A system may present video content with a data scroll on a video display device. The data scroll may include data scroll items that are automatically and consecutively presented on the video display device. Each of the data scroll items may include information associated with a particular topic. The system may receive a selection of a softkey corresponding to one of the data scroll items, retrieve, in response to receiving the selection of the softkey, additional content corresponding to the particular topic associated with the one of the data scroll items, and present the additional content on the video display device.

24 Claims, 13 Drawing Sheets

(56) References Cited

OTHER PUBLICATIONS

OpenCable—Enhanced Television (ETV), http://www.opencable.com/etv/, May 29, 2008 (print date), 1 Page.

"Enhanced TV Binary Interchange Format 1.0", OpenCable™Specifications, 420 pages, Sep. 21, 2007.

"Enhanced TV Application Messaging Specification", OpenCable™Specifications, 26 pages, Jul. 27, 2005.

L. Ellis, "The OCAP Primer: The Gateway to Interactive Content", http://www.ctam.com/ocap/etvandocap.htm, May 9, 2008 (print date), pp. 1-2.

* cited by examiner

US 8,667,526 B2

PROVIDING CONTENT RELATED TO AN ITEM IN AN INTERACTIVE DATA SCROLL

BACKGROUND

Television content is ever-changing. New channels or television programs, as well as Video On Demand (VoD) titles, are introduced every day. The amount of content available on television increases even more with the introduction of scrolling text.

Scrolling text is often used in television programs to provide current, up-to-date information or breaking news. Scrolling text is used in applications, such as news tickers, stock tickers, sports scores, and school closings. There may be times that the information in the tickers is of greater interest to a television viewer than the television program itself.

DETAILED DESCRIPTION OF PREFERRED EMBODIMENTS

The following detailed description refers to the accompanying drawings. The same reference numbers in different drawings may identify the same or similar elements. Also, the following detailed description does not limit the invention.

Implementations described herein may permit television viewers to obtain additional content relating to an item in a data scroll. A "data scroll," as used herein, may refer to a series or string of information items (e.g., text, graphics, and/or video) that are each associated with a particular topic. The information items may be consecutively, and possibly repeatedly, presented on a video display device, such as a television. An example of a data scroll might include a stock ticker, a news ticker, sports scores, or school closings. Another example of a data scroll might include closing credits of a movie or a television program. A further example of a data scroll might include a scroll of advertisements, a data feed (e.g., a Really Simple Syndication (RSS) or Atom feed), or a closed caption feed.

In one implementation, the data scroll may appear across the bottom or top of the display screen, down a side of the display screen, or elsewhere on the display screen. In another implementation, the data scroll may be hidden or transparent, or may be capable of being minimized by a viewer. As described herein, the data scroll may be interactive in the sense that the data scroll may provide information to a viewer that indicates to the viewer how the viewer can obtain additional content regarding an item in the data scroll. This additional content may be presented in different forms, such as text, graphics, and/or video. Techniques may also be provided to permit the viewer to easily return to the video content she was watching prior to accessing the additional content.

Figure 1:
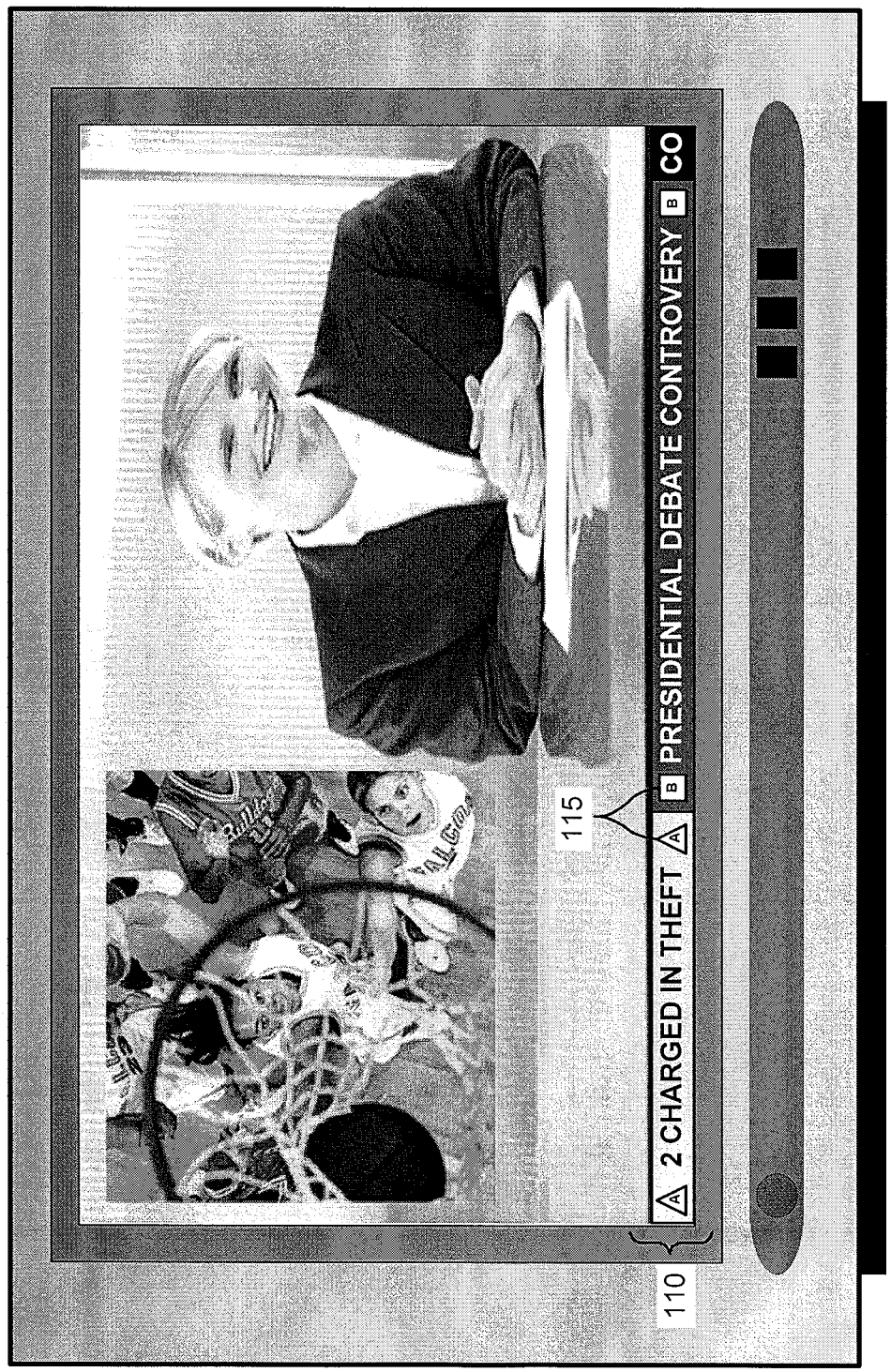
FIG. 1 is a diagram that illustrates an overview of an implementation described herein.

FIG. 1 is a diagram that illustrates an overview of an implementation described herein. As shown in FIG. 1, a data scroll 110 may be presented alongside video content relating to a television program. Data scroll 110 may present a television viewer with information regarding a single topic or a combination of topics, such as news, sports, stocks, school closings, advertisements, or other topics that may be of interest to a television viewer. In the example of FIG. 1, data scroll 110 presents information regarding news stories.

Data scroll 110 may present information for multiple news stories (e.g., headlines, titles, or other descriptors) and, for at least some of the news stories, a softkey identifier 115. Softkey identifier 115 may identify a button on a remote control (or another device) that can be pressed to obtain additional content regarding the news story. If the television viewer would like to see more information about a news story identified in data scroll 110, then the television viewer can press a corresponding button on the remote control. In response, the television viewer may be presented with additional content (e.g., text, graphics, and/or video) relating to the news story.

While the description herein will focus on data scrolls, the description is not so limited. The description may equally apply to data streams. A "data stream," as used herein, may refer to concurrent information about or related to a current video content stream. An example of a data stream might include a data scroll, an audio feed (e.g., the audio data that may accompany the video content stream), or a transcript (e.g., a transcript of the audio data that may accompany the video content stream). A viewer (of the video content stream) may press a button on a remote control (or another device) to obtain additional content regarding the data stream in a manner similar to that described herein.

Figure 2:
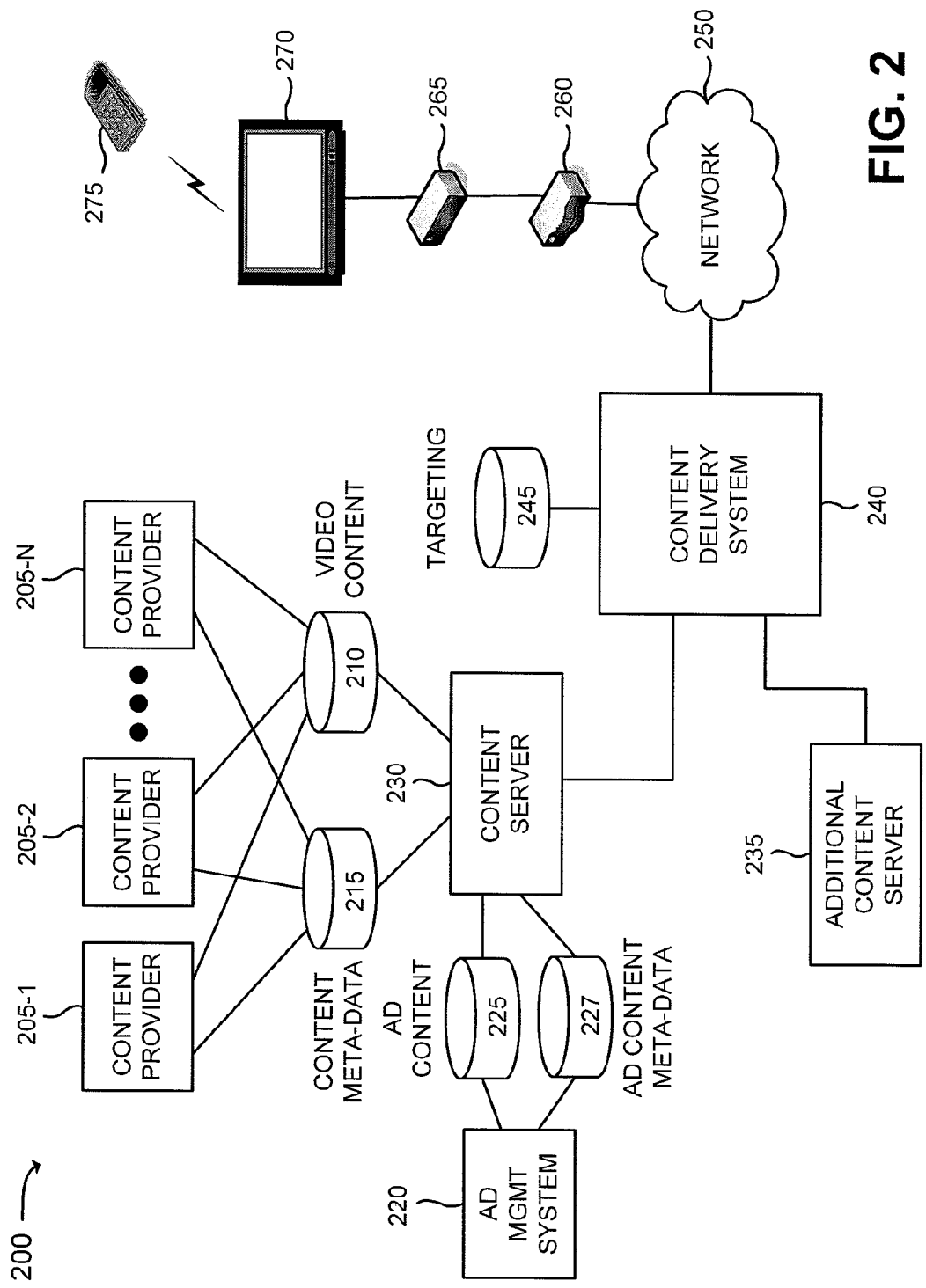
FIG. 2 is a diagram of an exemplary network in which systems and methods described herein may be implemented.

FIG. 2 is a diagram of an exemplary network 200 in which systems and methods described herein may be implemented. Network 200 may include content providers 205-1, 205-2, ..., 205-N (where N≥1) (collectively referred to as "content providers 205"), video content database 210, content meta-data database 215, advertising (ad) management (mgmt) system 220, advertising content database 225, advertising content meta-data database 227, content server 230, additional content server 235, content delivery system 240, targeting database 245, network 250, home router 260, video client 265, video display device 270, and remote control 275. In practice, network 200 may include more, fewer, different, or differently arranged devices than are shown in FIG. 2. Also, two or more of these devices may be implemented within a single device, or a single device may be implemented as multiple, distributed devices. Further, while FIG. 2 shows direct connections between devices, any of these connections can be indirectly made via a network, such as a local area network, a wide area network (e.g., the Internet), a telephone network (e.g., the Public Switched Telephone Network (PSTN) or a cellular network), or a combination of networks.

Content providers 205 may include any type or form of content providers. For example, content providers 205 may include free television broadcast providers (e.g., local broadcast providers, such as NBC, CBS, ABC, and Fox), for-pay television broadcast providers (e.g., TNT, ESPN, HBO, Cinemax, CNN, etc.), and/or Internet-based content providers (e.g., streaming content from web sites). Video content database 210 may store video signals representing the video programs provided by various ones of content providers 205. Content meta-data database 215 may store meta-data associated with the video programs provided by various ones of content providers 205. The meta-data might include program descriptions, program line-ups and/or schedules, data scrolls, or other information associated with the video programs in video content database 210.

Advertising management system 220 may control what advertising content is presented in connection with the video programs in video content database 210. Advertising management system 220 may store advertising content in advertising content database 225. The advertising content may include advertisements (e.g., commercials that are inserted within a program signal, long form advertisements that are not inserted within the program signal, text or graphics that are overlaid on a program or an advertisement, advertisements that are presented alongside the program signal, and/or interactive advertisements), links to advertisements that may be served via a network, such as the Internet, and/or data scrolls that contain advertising information. Advertising content meta-data database 227 may store meta-data associated with the advertisements in advertising content database 225. The meta-data might include scheduling information, rating information, category information, length of advertisement, classification information, expiration date of the advertisement, or other information that advertising management system 220 and/or content server 230 may find useful in serving and/or targeting the advertising content.

Content server 230 may include a device that may control the serving of video programs from video content database 210, the program meta-data from content meta-data database 215, the advertising content from advertising content database 225, and/or the advertising meta-data from advertising content meta-data database 227. In one implementation, content server 230 may include a content mixing engine to select information, such as video programs, program meta-data, advertising content, and/or advertisement meta-data, and mix the information together. Content server 230 may also perform transcoding of the mixed information.

Additional content server 235 may include a device that may obtain additional content relating to items in data scrolls. Additional content server 235 may associate an address (e.g., a Uniform Resource Locator (URL)) with an item in a data scroll, and use the address to fetch the additional content. Alternatively, or additionally, additional content server 235 may associate Internet content (e.g., a web video or web page) to an item in a data scroll, and retrieve this Internet content as the additional content. Alternatively, or additionally, additional content server 235 may associate video content of a particular content provider (e.g., one of content providers 205) to an item in a data scroll, and retrieve this video content as the additional content.

Content delivery system 240 may include a device that may deliver information to a customer's home equipment (e.g., a customer's video client 265). Content delivery system 240 may include a service adaptor component and a media relay component (not shown). The service adaptor component may control what information (e.g., what video programs, advertisements, and/or additional content) to provide to which customers based, for example, on customer subscriptions and/or profiles. The media relay component may control the transmission of the information to the customers. The media relay component may perform encoding and/or encryption functions.

Targeting database 245 may store data to assist in delivering customized, targeted content to users. For example, targeting database 245 may store information regarding user behavior, such as remote control button presses, video content recorded, recorded video content that is played, the types or genres of video content in which users expressed an interest, or other information that may be useful in customizing or targeting future content to the users, which may be collected with the express permission of the users. Targeting database 245 may also, or alternatively, store information from third party vendors, such as Rentrak, that indicates public interest in particular video content or particular types of genres of video content.

Network 250 may include a video signaling and distribution network to distribute the information from content delivery system 240. Network 250 may take the form of a wide area network, a local area network, an intranet, an Internet, a telephone network (e.g., the PSTN or a cellular network), an ad hoc network, a fiber optic network (e.g., a fiber optic service (FiOS) network), or a combination of networks.

Home router 260 may include a device that may provide connectivity between network 250 and one or more components of a local, home network. Home router 260 may receive information from network 250 for transmission on the home network, and/or receive information from the home network for transmission on network 250. Home router 260 may also provide firewall functionality for the home network, such as packet filtering and protection against network attacks.

Video client 265 may include a device that may receive and process the information from content delivery system 240 for display on video display device 270. In one implementation, video client 265 may take the form of a set-top box (STB). In another implementation, video client 265 may include a computer device, a cable card, a communication device (e.g., a telephone, such as a voice over Internet protocol (VoIP) telephone or a mobile telephone, or a personal digital assistant (PDA)), or the like. Video client 265 may perform decoding and/or decryption functions on information received from content delivery system 240. Video client 265 may also perform other functions, such as digital video recording (DVR) functions relating to the storage and playback of video content. Video client 265 may further perform Internet-based content retrieval functions, such as searching and/or retrieving web pages or other Internet-based content.

Video display device 270 may include a device that may receive and reproduce video and audio signals. In one implementation, video display device 270 may take the form of a television. In another implementation, video display device 270 may include a computer monitor, a display of a communication device (e.g., a telephone, such as a VoIP telephone or a mobile telephone, or a PDA), or the like.

Remote control 275 may include a device that may remotely control the operation of video client 265 and/or video display device 270. Remote control 275 may take the form of a remote control device similar to a television or STB remote control device, a game controller, a keyboard, a keypad, a PDA, a mobile telephone, or the like. Remote control 275 may provide commands to video client 265 and/or video display device 270 by transmitting signals, such as wireless signals (e.g., infrared or Bluetooth) or signals transmitted over wires (e.g., over a universal serial bus (USB) interface or the like), to a reader associated with video client 265 and/or video display device 270.

Figure 3:
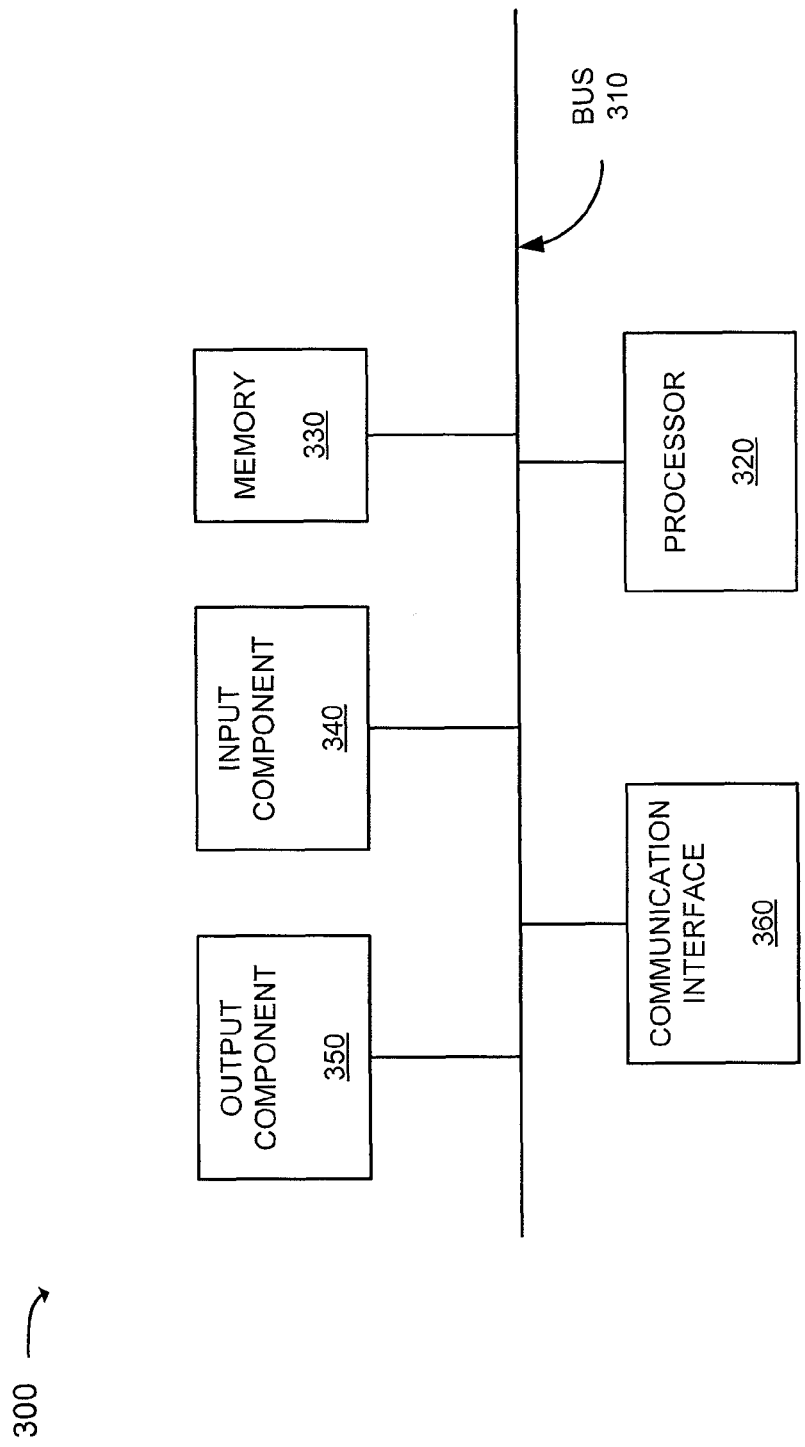
FIG. 3 is a diagram of exemplary components of a device of FIG. 2.

FIG. 3 is a diagram of exemplary components of a device 300. Each of the devices illustrated in FIG. 2 may include one or more devices 300.

Device 300 may include a bus 310, a processor 320, a memory 330, an input component 340, an output component 350, and a communication interface 360. In another implementation, device 300 may include more, fewer, different, or differently arranged components.

Bus 310 may include a path that permits communication among the components of device 300. Processor 320 may include a processor, microprocessor, or processing logic (e.g., a field-programmable gate array (FPGA), an application-specific integrated circuit (ASIC), etc.) that may interpret and execute instructions. Memory 330 may include a random access memory (RAM), a read only memory (ROM), or another type of dynamic or static storage device (e.g., a flash, magnetic, or optical memory) that may store information and/or instructions for use by processor 320.

Input component 340 may include a mechanism that permits an operator to input information to device 300, such as a keyboard, a keypad, a button, a switch, etc. Output component 350 may include a mechanism that outputs information to the operator, such as a display, a speaker, one or more light emitting diodes (LEDs), etc. Communication interface 360 may include any transceiver-like mechanism, such as a transceiver and/or a separate receiver and transmitter, that enables device 300 to communicate with other devices and/or systems. For example, communication interface 360 may include an Ethernet interface, an optical interface, a coaxial interface, an infrared interface, a radio frequency (RF) interface, or the like.

As will be described in detail below, device 300, as implemented within one or more of the devices in FIG. 2, may perform certain operations relating to providing data scrolls and obtaining additional content relating to an item in a data scroll. Device 300 may perform these operations in response to processor 320 executing software instructions contained in a computer-readable medium, such as memory 330. A computer-readable medium may be defined as a physical or logical memory device.

The software instructions may be read into memory 330 from another computer-readable medium or from another device via communication interface 360. The software instructions stored in memory 330 may cause processor 320 to perform processes that are described below. Alternatively, hardwired circuitry may be used in place of or in combination with software instructions to implement processes described herein. Thus, implementations described herein are not limited to any specific combination of hardware circuitry and software.

Figure 4:
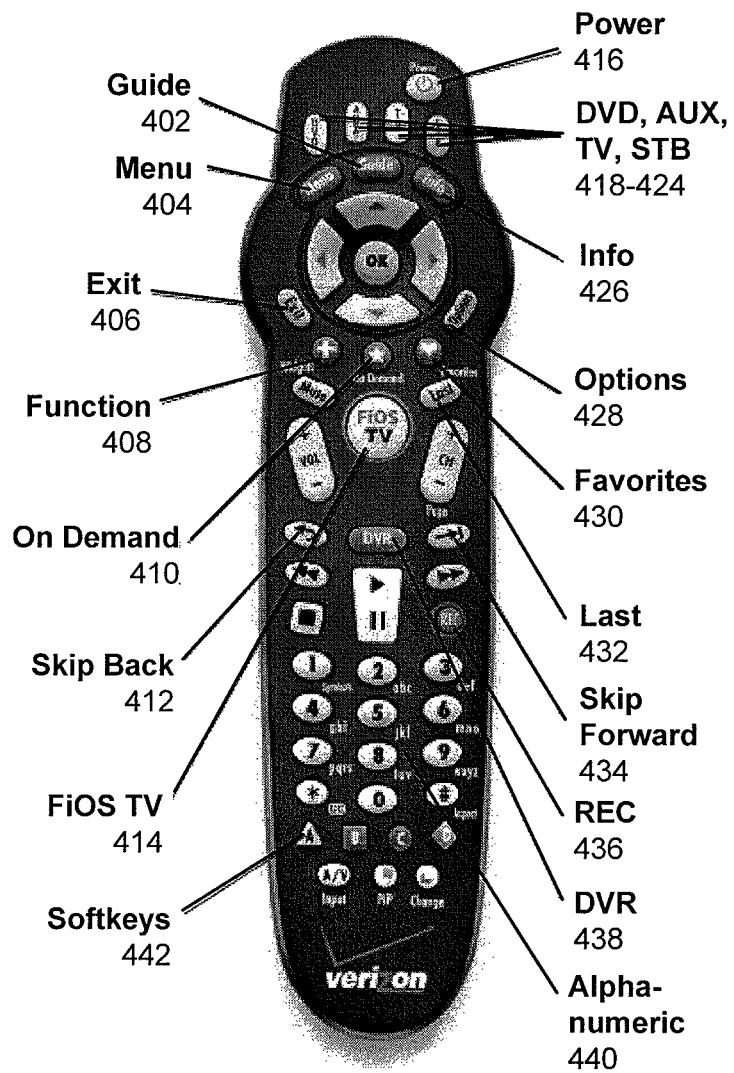
FIG. 4 is a diagram of an exemplary configuration of a remote control that may be employed in the network of FIG. 2.

FIG. 4 is a diagram of an exemplary configuration of remote control 275. As shown in FIG. 4, remote control 275 may include a number of buttons that may cause video client 265 and/or video display device 270 to perform various functions. As shown in FIG. 4, remote control 275 may include guide 402, menu 404, exit 406, function 408, On Demand 410, skip back 412, FiOS TV 414, power 416, DVD 418, AUX 420, TV 422, STB 424, Info 426, options 428, favorites 430, last 432, skip forward 434, record (REC) 436, DVR 438, alphanumeric 440, and softkeys 442. In other implementations, remote control 275 may be include more, fewer, different, or differently arranged buttons. For example, remote control 275 may include a display screen that can present information for display or receive information via touch screen technology. In one implementation, this display screen may present virtual buttons that may be selected to perform certain functions.

Guide 402 may provide access to an interactive programming guide. Menu 404 may provide access to an on-screen display for a currently selected device, such as a DVD player, an auxiliary device, a video display device (e.g., TV), or a video client (e.g., set-top box). Exit 406 may close an on-screen display and return to particular video content or a previous on-screen display, or go to a particular on-screen display, such as a "home" page. Function 408 may provide access to certain functions and/or provide flexibility for future features. On Demand 410 may provide access to On Demand programming. Skip back 412 may activate an instant replay function. FiOS TV 414 may provide access to live TV programming or interactive content.

Power 416 may turn a selected device on or off. DVD 418 may permit selection of an associated DVD player. AUX 420 may permit selection of an associated auxiliary device, such as a video cassette recorder or an audio system. TV 422 may permit selection of a video display device, such as a TV. STB 424 may permit selection of a video client, such as a set-top box. Info 426 may cause a description of particular video content to be presented. Options 428 may cause helpful information or user-configurable settings to be presented. Favorites 430 may cause a favorite channel listing to be presented. Last 432 may cause video content associated with a last-selected channel or a previous screen of interactive content to be presented. Skip forward 434 may move forward within recorded video content. REC 436 may permit video content to be recorded. DVR 438 may permit a DVR function of a video client to be launched. Alphanumeric 440 may include alphanumeric buttons that may be used for channel selection and other functions.

Softkeys 442 may provide access to additional content, as described below. A "softkey," as used herein, may refer to any remote control button whose function is "soft" (i.e., capable of being changed). As described herein, softkeys 442 may have functions that can change based on what is displayed on video display device 270. In one implementation, this change of function does not require any change to the programming of remote control 275. Instead, video client 265 (or a back-end system, such as content server 230 or content delivery system 240) may change the function assigned to a softkey 442 such that video client 265 may cause two different functions to be performed (e.g., two different sets of information may be presented on video display device 270) when the same softkey 442 is pressed at two different instances in time.

As shown in FIG. 4, softkeys 442 may include a yellow, triangular A button; a blue, square-shaped B button; a red, circular C button; and a green, diamond-shaped D button. These softkeys 442 are examples of buttons that can be included on remote control 275. In other implementations, there may be more or fewer softkeys 442. While softkeys 442 are shown as separate buttons from other buttons on remote control 275, this need not be the case. For example, other buttons on remote control 275 can be included as softkeys. The alphanumeric buttons 440, for example, can be configured to provide digit entry (e.g., entering channel numbers) in one situation and perform another function in another situation.

Figure 5:
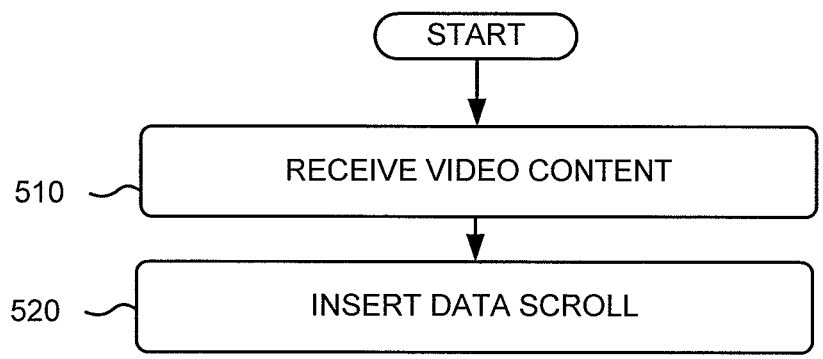
FIG. 5 is a flowchart of an exemplary process for inserting a data scroll in connection with video content.

FIG. 5 is a flowchart of an exemplary process for inserting a data scroll in connection with video content. In one implementation, one or more of the process blocks of FIG. 5 may be performed by one or more components within video client 265, content delivery system 240, and/or content server 230. In another implementation, one or more of the process blocks of FIG. 5 may be performed by one or more other devices shown in network 200 of FIG. 2.

The process may include receiving video content (block 510). The video content may include television programs, movies, sporting events, or other types of video content for which it might be beneficial to include a data scroll.

A data scroll may be inserted (block 520). In one implementation, the data scroll may be "baked in" to the video content. For example, a back-end system, such as content server 230 or content delivery system 240 (or even one of content providers 205) may overlay the data scroll on top of the video content or embed the data scroll into the video content. In another implementation, the video content stream may be transmitted with an enhanced data scroll so that video client 265 can draw a new data scroll over the enhanced data scroll present in the video content stream. In yet another implementation, the data scroll may be an Internet feed (e.g., a RSS or Atom feed) that video client 265 may overlay on the video content. In a further implementation, the data scroll may be inserted into the video content stream using technology, such as Enhanced TV Binary Interchange Format (EBIF). In this case, content server 230 or content delivery system 240 may insert the data scroll into the video content stream transmitted to video client 265. Video client 265 may include software to identify and retrieve the data scroll, and overlay the data scroll on top of the video content.

Figure 6:
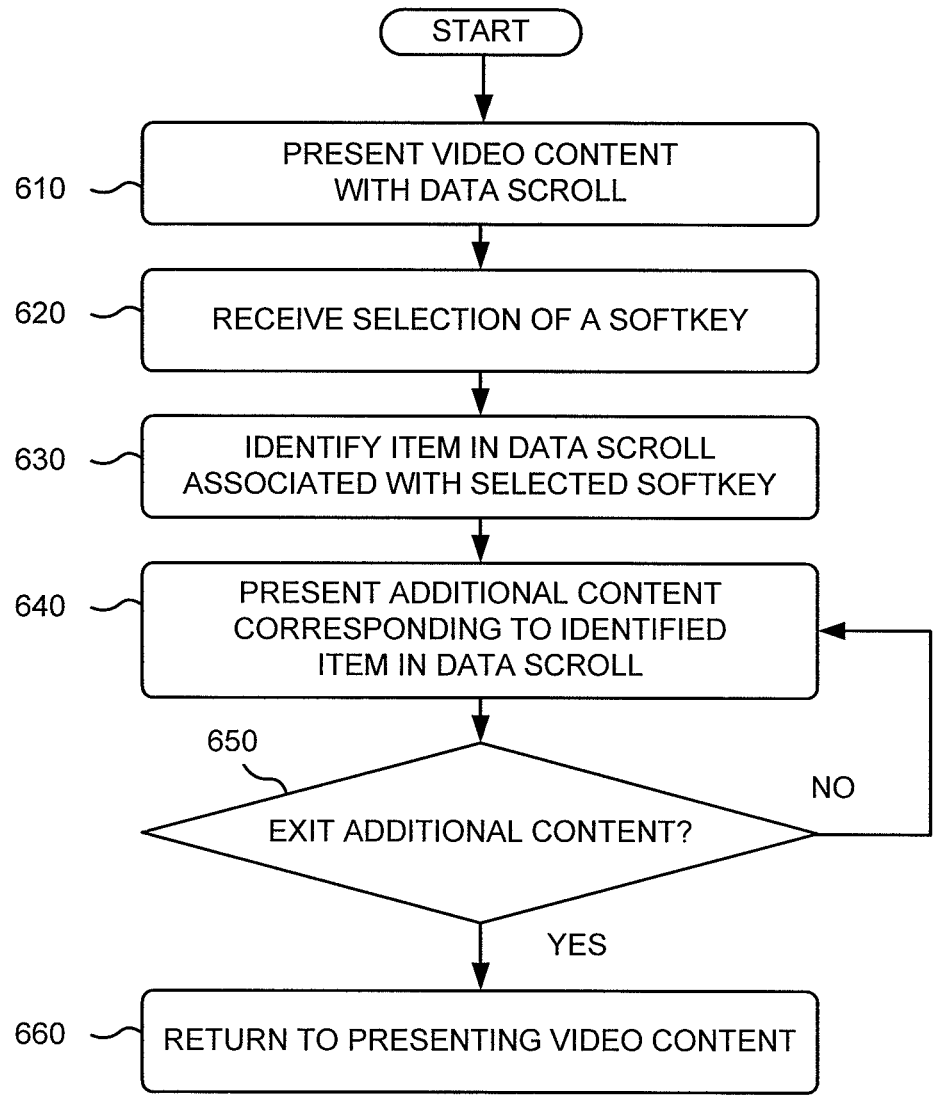
FIG. 6 is a flowchart of an exemplary process for presenting additional content related to information in a data scroll.

FIG. 6 is a flowchart of an exemplary process for presenting additional content related to information in a data scroll. In one implementation, one or more of the process blocks of FIG. 6 may be performed by components within video client 265. In another implementation, one or more of the process blocks of FIG. 6 may be performed by one or more other devices shown in network 200 of FIG. 2.

The process may include presenting video content with a data scroll (block 610). For example, video client 265 may receive the video content with the data scroll embedded within or overlaid on the video content. Alternatively, video client 265 may receive the video content and overlay the data scroll on the video content. Video client 265 may cause the video content and the data scroll to be presented on video display device 270. The data scroll may be visible and located along the bottom or top of, along one of the sides of, or elsewhere within the video content. Alternatively, the data scroll may be transparent, hidden, or minimized.

Figure 7A:
FIGS. 7A and 7B are diagrams of data scrolls that may be presented in connection with video content.
Figure 7B:

FIGS. 7A and 7B are diagrams of data scrolls that may be presented in connection with video content. As shown in FIG. 7A, a data scroll 710 may include a number of items 720, 730, and 740. While three data scroll items are shown in FIG. 7A, data scroll 710 may include more or fewer data scroll items, and any number of these data scroll items may be visible on the video display device at any one time. As shown in FIG. 7A, data scroll item 720 may relate to individuals charged in a theft, data scroll item 730 may relate to a presidential debate controversy, and data scroll item 740 may relate to a cold front that is approaching.

One or more of data scroll items 720, 730, or 740 may indicate that additional content may be available for the topic associated with the data scroll item. In one implementation, to indicate that additional content is available, a data scroll item 720, 730, or 740 may include a visual indicator (e.g., indicators 725 and 735) that relates to one of softkeys 416 and makes it easy for a viewer to determine which of softkeys 416 to select (e.g., press) to obtain the additional content. For example, a data scroll item 720, 730, or 740 may include a colored background, a shaped icon, and/or a letter that matches the corresponding one of softkeys 416. As shown in FIG. 7A, data scroll item 720 may include a yellow colored background that matches the yellow color of the A softkey, a triangular icon 725 that matches the shape of the A softkey, and/or the letter "A" (within triangular icon 725) that matches the letter on the A softkey. As further shown in FIG. 7A, data scroll 730 may include a blue colored background that matches the blue color of the B softkey, a square-shaped icon 735 that matches the shape of the B softkey, and/or the letter "B" (within square-shaped icon 735) that matches the letter on the B softkey.

As shown in FIG. 7B, a data scroll item, such as data scroll item 730, may include an additional identifier 738 that indicates the type of content that will be presented when the corresponding softkey is selected. Identifier 738 may take different forms. For example, identifier 738 may include an icon that indicates that video content is available, an icon that indicates that text content is available, or an icon that indicates that graphics content is available. Alternatively, the lack of an identifier 738 may be used to indicate that a particular ("default") type of content is available.

The matching of softkeys to data scroll items is flexible. The number of data scroll items may exceed the number of softkeys that are available. Thus, softkeys may be periodically reassigned and reused, as necessary. In one implementation, video client 265 may record, or otherwise track, the assignment of softkeys to data scroll items so that video client 265 can determine how to interpret the selection of a softkey. In another implementation, a mapping of a data scroll item to a softkey may be maintained by a back-end system, such as content server 230, additional content server 235, or content delivery system 240. The association of a softkey to a data scroll item (or to the additional content associated with the data scroll item) may be transmitted in the video content stream using a technology, such as EBIF.

A softkey may remain assigned to a particular data scroll item even when that data scroll item is not currently visible on video display device 270. In one implementation, a softkey may remain assigned to a particular data scroll item until that softkey is assigned to another data scroll item.

Returning to FIG. 6, selection of a softkey may be received (block 620). For example, a viewer of the video content may press a button on remote control 275 corresponding to a softkey (e.g., one of softkeys 416) that corresponds to a data scroll item for which the viewer desires additional content. The data scroll item (or the additional content associated with the data scroll item) corresponding to the selected softkey may be identified (block 630). For example, video client 265 may perform a look-up operation (either itself or via a back-end system) to determine which data scroll item corresponds to the selected softkey, or may identify the data scroll item (or perhaps the additional content itself) from the video content stream.

Additional content corresponding to the identified data scroll item may be presented (block 640). For example, video client 265 may retrieve the additional content from a memory (within video client 265 or within a back-end system, such as additional content server 235, content server 230, or content delivery system 240) based on an identifier associated with the identified data scroll item, and cause video display device 270 to display the additional content. The additional content can be can be text-based (referred to herein as "text content"), graphics or animation based (referred to herein as "graphics content"), or audio-video-based (referred to herein as "video content"). In one implementation, video client 265 may associate an address (e.g., a URL) with a data scroll item, and use that address to retrieve the additional content (e.g., text, graphics, or video content). Alternatively, when the data scroll includes an Internet feed, video client 265 may use the Internet feed to retrieve the additional content. Alternatively, video client 265 may associate content available on another channel of the video content stream from the same, or a different, content provider, and may automatically tune video display device 270 to this other channel (transparently to the viewer). In this case, this other channel may include broadcast video content, video-on-demand content, or IP unicast content. Alternatively, video client 265 may obtain the additional content from the video content stream. In this case, the additional content may be inserted into the video content stream using a technology, such as EBIF. Video client 265 may include software that can recognize and extract this additional content.

Figure 8A:
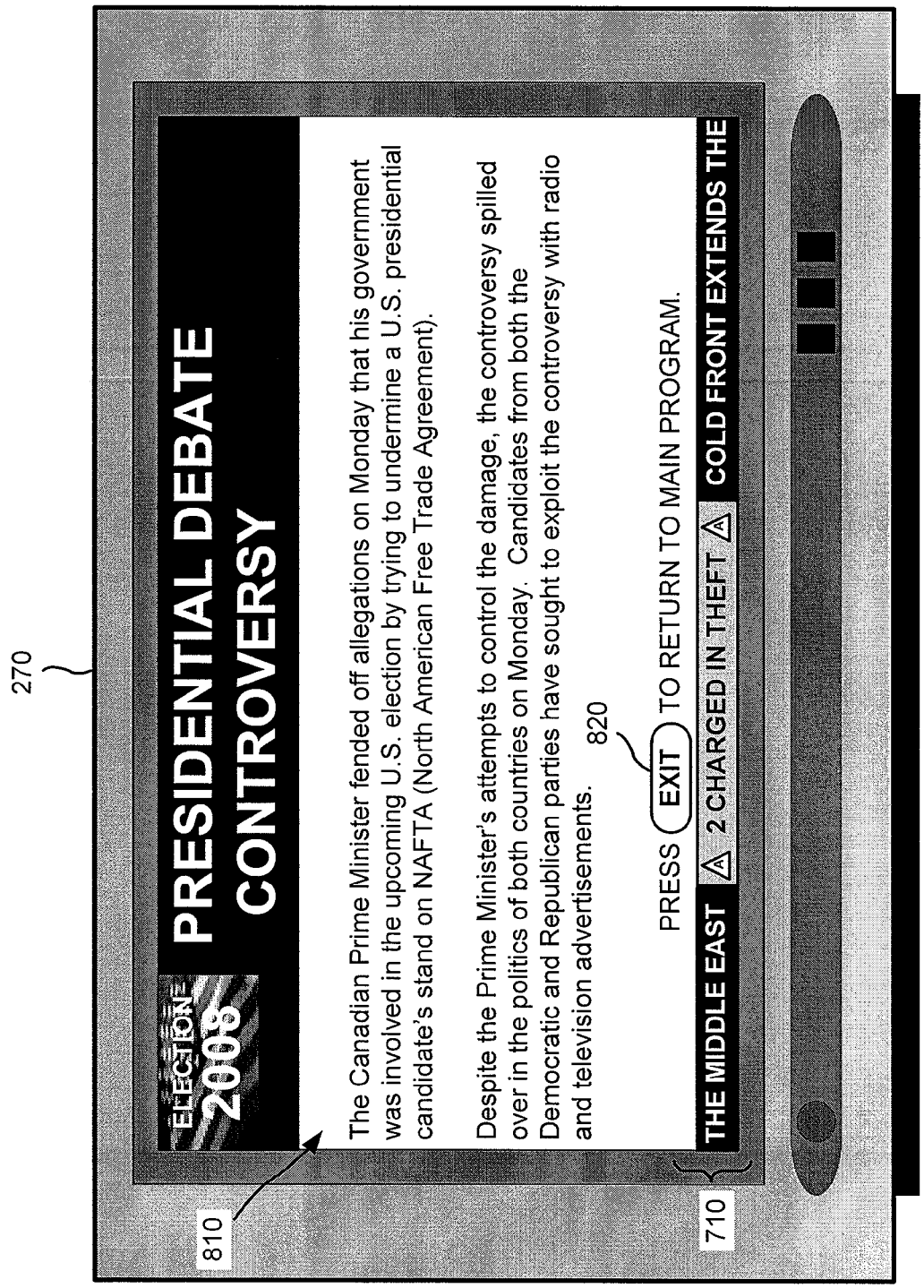
FIGS. 8A-8C are diagrams of additional content that may be presented in connection with an item in a data scroll.
Figure 8B:
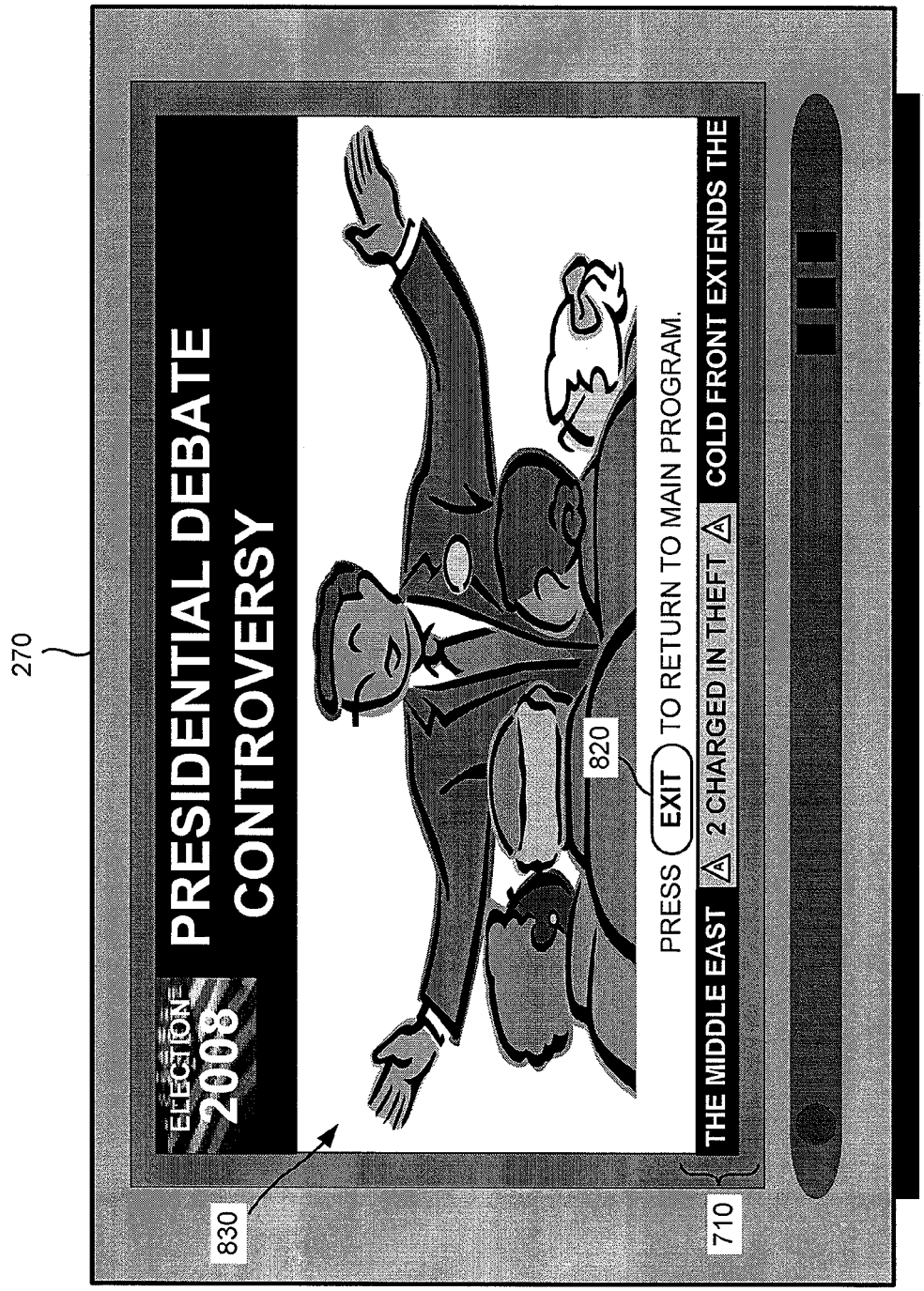
Figure 8C:
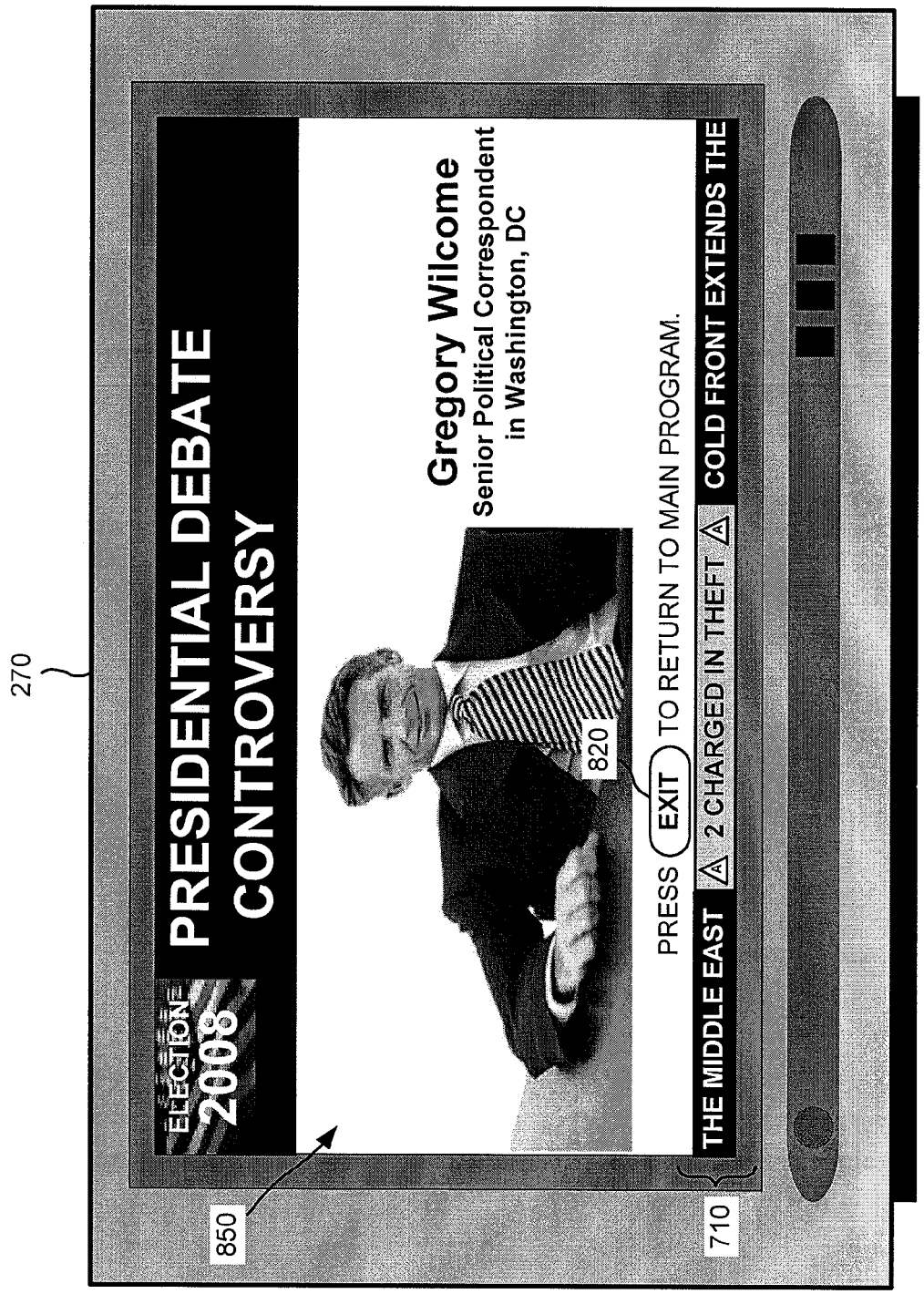

FIGS. 8A-8C are diagrams of additional content that may be presented in connection with an item in a data scroll. FIG. 8A shows an example of additional content in the form of text content, FIG. 8B shows an example of additional content in the form of graphics content, and FIG. 8C shows an example of additional content in the form of video content.

As shown in FIG. 8A, text content 810 may be presented on video display device 270. An indicator 820 informing the viewer how to exit the additional content may also be presented. For example, as shown in FIG. 8A, indicator 820 may inform the viewer to press an exit button (e.g., exit button 406 in FIG. 4) on remote control 275 to return to the video content that the viewer was viewing prior to accessing the additional content. As further shown in FIG. 8A, data scroll 710 may continue to be presented. The presence of data scroll 710 may permit the viewer to access additional content related to another data scroll item at any time.

As shown in FIG. 8B, graphics content 830 may be presented on video display device 270. An indicator 820 informing the viewer how to exit the additional content may also be presented. Similar to that shown in FIG. 8A, indicator 820 may inform the viewer to press an exit button (e.g., exit button 406 in FIG. 4) to return to the video content that the viewer was viewing prior to accessing the additional content. As further shown in FIG. 8B, data scroll 710 may continue to be presented. The presence of data scroll 710 may permit the viewer to access additional content related to another data scroll item at any time.

As shown in FIG. 8C, video content 850 may be presented on video display device 270. An indicator 820 informing the viewer how to exit the additional content may also be presented. Similar to that shown in FIG. 8A, indicator 820 may inform the viewer to press an exit button (e.g., exit button 406 in FIG. 4) to return to the video content that the viewer was viewing prior to accessing the additional content. As further shown in FIG. 8C, data scroll 710 may continue to be presented. The presence of data scroll 710 may permit the viewer to access additional content related to another data scroll item at any time.

Returning to FIG. 6, it may be determined whether to exit the additional content (block 650). This determination may be based on one or more of a number of different factors. For example, the additional content may be automatically exited upon the expiration of a period of time. Alternatively, when the additional content is video content or graphics content, the additional content may be automatically exited when the video or graphics ends. Alternatively, the additional content may be exited when the viewer instructs it. For example, the viewer may select a particular button on remote control 275 (e.g., exit button 406) to indicate that the viewer desires to exit the additional content.

Upon exiting the additional content, the video content previously being presented (e.g., the video content being presented before accessing the additional content) may again be presented (block 660). For example, video client 265 may cause video display device 270 to return to presenting the video content. In one implementation, video client 265 may cause the video content to be presented to the viewer at the current ("live") position within the broadcast. In another implementation, video client 265 may cause the video content to be presented to the viewer at the last position within the broadcast that was presented before presenting the additional content. In this case, video client 265 may buffer the video content broadcast until the viewer returns to the video content. In yet another implementation, video client 265 may cause the video content to be presented to the viewer from a pre-selected position within the video content broadcast (e.g., from the beginning of the video content broadcast). In this case, video client 265 may buffer all or a portion of the video content for a starting point when the viewer returns to the video content. The particular manner of returning to the video content may be preset or user-configurable.

Instead of directly returning to the video content, video client 265 may present the viewer with a set of options. In one implementation, these options may include presenting the video content at the current ("live") position within the broadcast, presenting the video content at the last position within the broadcast that was presented before presenting the additional content, presenting the video content at a pre-selected position within the video content broadcast, or presenting more information regarding the additional content.

Figure 9:
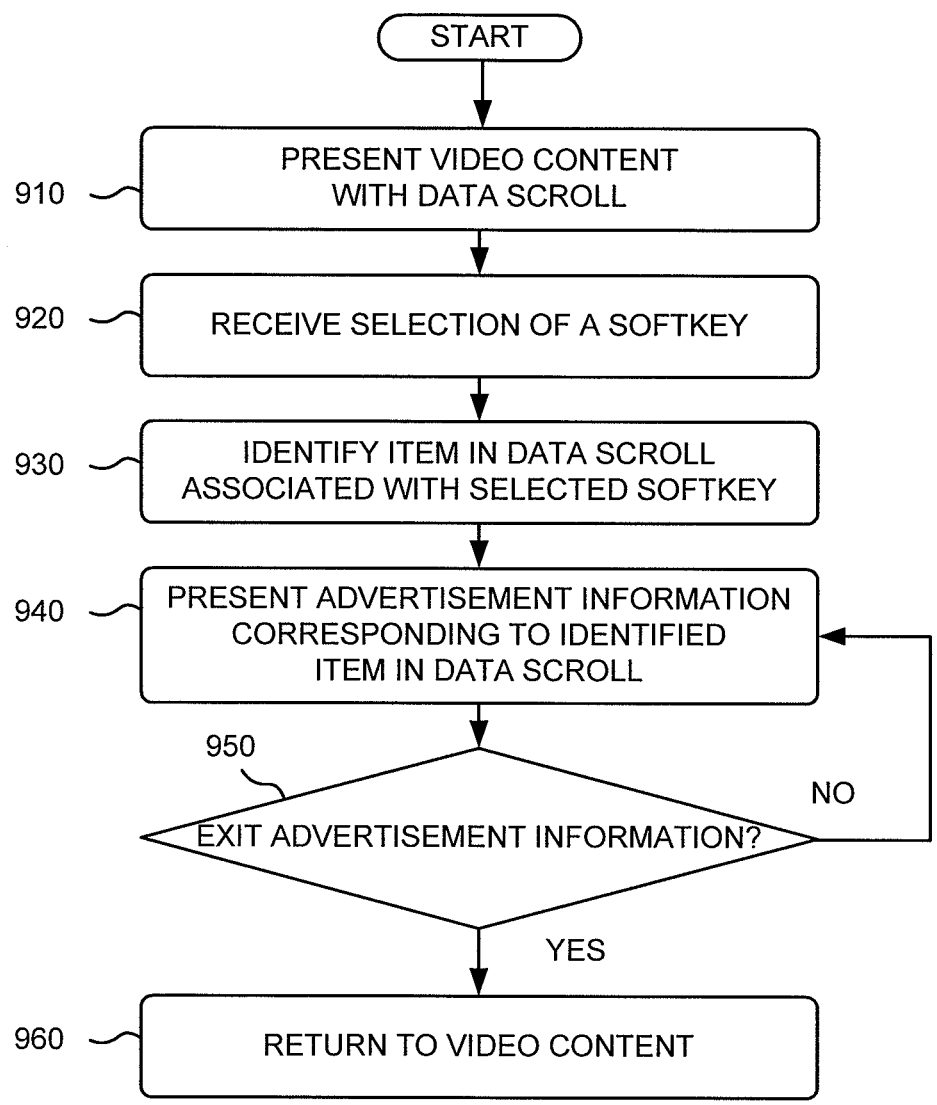
FIG. 9 is a flowchart of an exemplary process for presenting advertisement information related to information in a data scroll.

FIG. 9 is a flowchart of an exemplary process for presenting additional content related to information in a data scroll. In one implementation, one or more of the process blocks of FIG. 9 may be performed by components within video client 265. In another implementation, one or more of the process blocks of FIG. 9 may be performed by one or more other devices shown in network 200 of FIG. 2.

The process may include presenting video content with a data scroll (block 910). For example, video client 265 may receive the video content with the data scroll embedded within or overlaid on the video content. Alternatively, video client 265 may receive the video content and overlay the data scroll on the video content. Video client 265 may cause the video content and the data scroll to be presented on video display device 270. The data scroll may be visible and located along the bottom or top of, along one of the sides of, or elsewhere within the video content. Alternatively, the data scroll may be transparent, hidden, or minimized.

Figure 10:
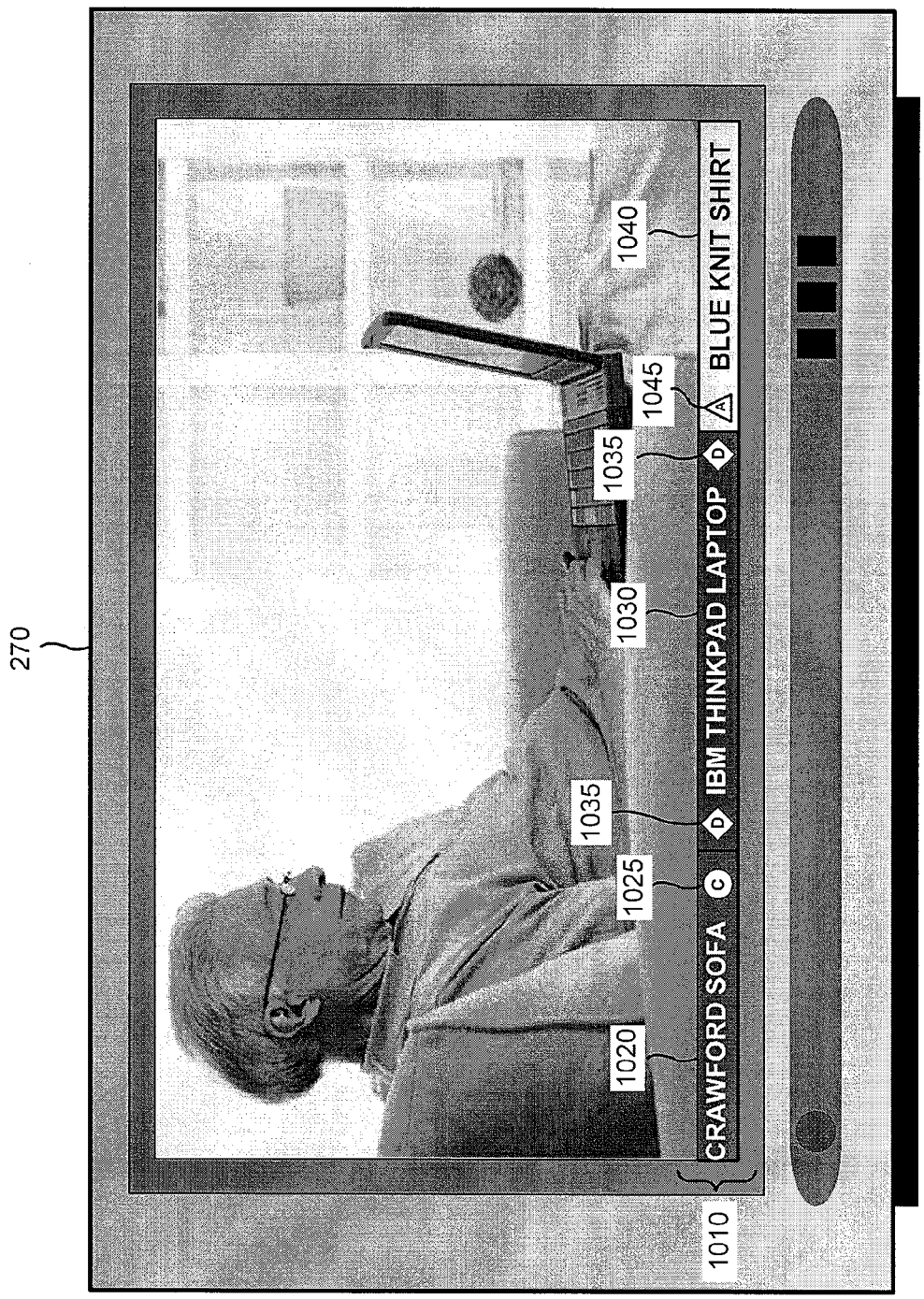
FIG. 10 is a diagram of a data scroll that may be presented in connection with video content.

FIG. 10 is a diagram of a data scroll that may be presented in connection with video content. The exemplary video content shown in FIG. 10 includes a man sitting on a sofa and working on a laptop.

As shown in FIG. 10, a data scroll 1010 may include a number of items 1020, 1030, and 1040. While three data scroll items are shown in FIG. 10, data scroll 1010 may include more or fewer data scroll items, and any number of these data scroll items may be visible on the video display device at any one time. As shown in FIG. 10, data scroll item 1020 may relate to the Crawford sofa on which the man (shown in video display device 270) is sitting, data scroll item 1030 may relate to the IBM ThinkPad laptop on the man's lap, and data scroll item 1040 may relate to the blue knit shirt that the man is wearing.

One or more of data scroll items 1020, 1030, or 1040 may indicate that additional content (e.g., advertisement information) is available for the object associated with the data scroll item. In one implementation, to indicate that advertisement information is available, a data scroll item 1020, 1030, or 1040 may include a visual indicator (e.g., indicators 1025, 1035, and 1045) that relates to one of softkeys 416, making it easy for a viewer to determine which of softkeys 416 to select (e.g., press) to obtain the advertisement information. For example, a data scroll item 1020, 1030, or 1040 may include a colored background, a shaped icon, and/or a letter that matches the corresponding one of softkeys 416. As shown in FIG. 10, data scroll item 1020 may include a red colored background that matches the red color of the C softkey, a circular icon 1025 that matches the shape of the C softkey, and/or the letter "C" (within circular icon 1025) that matches the letter on the C softkey. As further shown in FIG. 10, data scroll 1030 may include a green colored background that matches the green color of the D softkey, a diamond-shaped icon 1035 that matches the shape of the D softkey, and/or the letter "D" (within diamond-shaped icon 1035) that matches the letter on the D softkey. As further shown in FIG. 10, data scroll 1040 may include a yellow colored background that matches the yellow color of the A softkey, a triangular icon 1045 that matches the shape of the A softkey, and/or the letter "A" (within triangular icon 1045) that matches the letter on the A softkey.

Using such a data scroll, particular advertisement information may be targeted for particular viewers. For example, information regarding viewers' preferences, information regarding viewers' behavior over time, and/or information from third party vendors may be used to deliver customized, targeted advertisement information. This information may be collected (with express permission from the viewers) and stored in targeting database 245. Instead of, or in addition to, presenting advertisement information relating to one of the objects currently presented within the video content, advertisement information relating to a different set of objects or other objects may be accessible via the data scroll.

Returning to FIG. 9, selection of a softkey may be received (block 920). For example, a viewer of the video content may press a button on remote control 275 corresponding to a softkey (e.g., one of softkeys 416) that corresponds to a data scroll item for which the viewer desires advertisement information. The data scroll item (or advertisement information associated with the data scroll item) corresponding to the selected softkey may be identified (block 930). For example, video client 265 may perform a look-up operation (either itself or via a back-end system, such as additional content server 235, content server 230, or content delivery system 240) to determine which data scroll item corresponds to the selected softkey, or may identify the data scroll item (or perhaps the advertisement information itself) from the video content stream.

Advertisement information corresponding to the identified data scroll item may be presented (block 940). For example, video client 265 may retrieve the advertisement information and cause video display device 270 to display the advertisement information. The advertisement information can include text content, graphics content, or video content.

In one implementation, video client 265 may associate an address (e.g., a URL) with a data scroll item, and use that address to retrieve the advertisement information (e.g., text, graphics, or video content). The advertisement information may be retrieved from a local memory (i.e., local to video client 265) or from a back-end system, such as additional content server 235, content server 230, or content delivery system 240. Alternatively, when the data scroll includes an Internet feed, video client 265 may use the Internet feed to retrieve the advertisement information. Alternatively, video client 265 may associate advertisement information available on another channel of the video content stream from the same, or a different, content provider, and may automatically tune video display device 270 to this other channel (transparently to the viewer). Alternatively, video client 265 may obtain the advertisement information from the video content stream. In this case, the advertisement information may be inserted into the video content stream using a technology, such as EBIF. Video client 265 may include software that can recognize and extract this advertisement information.

In one implementation, the advertisement information may be presented within or connected to an interactive marketplace via which the viewer can make a purchase or obtain additional information regarding the advertised product or service.

It may be determined whether to exit the advertisement information (block 950). This determination may be based on one or more of a number of different factors. For example, the advertisement information may be automatically exited upon the expiration of a period of time. Alternatively, when the advertisement information is video content or graphics content, for example, the advertisement information may be automatically exited when the video or graphics ends. Alternatively, the advertisement information may be exited when the viewer instructs it. For example, the viewer may select a particular button on remote control 275 (e.g., exit button 406) to indicate that the viewer desires to exit the advertisement information. Alternatively, the advertisement information may be exited when the viewer completes a purchase relating to the advertised product or service.

Upon exiting the advertisement information, the video content previously being presented (e.g., the video content being presented before accessing the advertisement information) may again be presented (block 960). For example, video client 265 may cause video display device 270 to return to presenting the video content. In one implementation, video client 265 may cause the video content to be presented to the viewer at the current ("live") position within the broadcast. In another implementation, video client 265 may cause the video content to be presented to the viewer at the last position within the broadcast that was presented before presenting the advertisement information. In this case, video client 265 may buffer the video content broadcast until the viewer returns to the video content. In yet another implementation, video client 265 may cause the video content to be presented to the viewer from a pre-selected position within the video content broadcast (e.g., from the beginning of the video content broadcast). In this case, video client 265 may buffer all or a portion of the video content for a starting point when the viewer returns to the video content. The particular manner of returning to the video content may be preset or user-configurable.

Instead of directly returning to the video content, video client 265 may present the viewer with a set of options. In one implementation, these options may include presenting the video content at the current ("live") position within the broadcast, presenting the video content at the last position within the broadcast that was presented before presenting the additional content, presenting the video content at a pre-selected position within the video content broadcast, or presenting more information regarding the advertisement information.

Information regarding what advertisement information that viewers desired may be collected (with express permission from the viewers), stored in targeting database 245, and used to target future advertisements to those viewers. These future advertisements may take the form of data scroll items, banner advertisements, standard television commercials, etc.

Implementations described herein may provide viewers with an opportunity to obtain additional content relating to an item in a data scroll. In this sense, the data scroll, as described herein, may be interactive and may differ from static data scrolls.

The foregoing description provides illustration and description, but is not intended to be exhaustive or to limit the invention to the precise form disclosed. Modifications and variations are possible in light of the above teachings or may be acquired from practice of the invention.

For example, while series of blocks have been described with regard to FIGS. 5, 6, and 9, the order of the blocks may be modified in other implementations. Further, non-dependent blocks may be performed in parallel.

Also, certain screen displays have been presented with regard to FIGS. 7A-7B, 8A-8C, and 10. These screen displays are purely exemplary in nature and merely serve to facilitate the description of a data scroll and functions that can be performed in connection with the data scroll.

Further, certain terms, like "users," "viewers," and "customers," have been referred to above. It should be understood that these terms are intended to be interchangeable.

Also, a softkey has been described as a button on a remote control. In another implementation, a softkey may correspond to a button on a video client, such as a set-top box, or a video display device, such as a television.

It will be apparent that systems and methods, as described above, may be implemented in many different forms of software, firmware, and hardware in the implementations illustrated in the figures. The actual software code or specialized control hardware used to implement these systems and methods is not limiting of the invention. Thus, the operation and behavior of the systems and methods were described without reference to the specific software code—it being understood that software and control hardware can be designed to implement the systems and methods based on the description herein.

No element, act, or instruction used in the present application should be construed as critical or essential to the invention unless explicitly described as such. Also, as used herein, the article "a" is intended to include one or more items. Where only one item is intended, the term "tone" or similar language is used. Further, the phrase "based on" is intended to mean "based, at least in part, on" unless explicitly stated otherwise.

What is claimed is:

1. A method, comprising:
    providing, by a network device, video content with a data scroll for display on a video display device,
        the data scroll including a plurality of data scroll items that are automatically and consecutively presented on the video display device with the video content,
        each of the plurality of data scroll items including information identifying a particular topic of a respective additional content,
            a background color of each of the plurality of data scroll items, displayed on the video display device, being different and matching a color of a corresponding softkey of a plurality of softkeys of a remote control,
        the background color of a first one of the plurality of data scroll items matching the color of the first softkey,
        the first one of the plurality of data scroll items including:
            information identifying the particular topic, of a first additional content, identified by the first one of the plurality of data scroll items,
            a first icon identifying the first softkey, and
            a second icon identifying a type of content of the first additional content, the second icon being different than the first icon,
        the background color of a second one of the plurality of data scroll items matching the color of a second softkey of the plurality of softkeys of the remote control,
            the second softkey being different than the first softkey,
        the second one of the plurality of data scroll items including:
            information identifying the particular topic, of a second additional content different than the first additional content, identified by the second one of the plurality of data scroll items, and
            a third icon identifying the second softkey, the third icon being different than the first icon and the second icon;
    detecting, by the network device, selection of the first softkey corresponding to the first one of the plurality of data scroll items;
    retrieving, by the network device and based on detecting the selection of the first softkey, the first additional content of the particular topic identified by the first one of the plurality of data scroll items,
        the second additional content, of the particular topic identified by the second one of the plurality of data scroll items, being retrieved when the second softkey is selected; and
    providing, by the network device, the first additional content for display on the video display device,
        providing the first additional content for display on the video display device including:
            providing, without the video content, the first additional content for display on the video display device with the second one of the plurality of data scroll items and a third one of the plurality of data scroll items.

2. The method of claim 1, further comprising:
    receiving the video content in a video stream; and
    receiving the data scroll within the video stream.

3. The method of claim 1, further comprising:
    receiving the video content in a video stream; and
    receiving the first additional content within the video stream.

4. The method of claim 3, where retrieving the first additional content includes:
    extracting the first additional content from within the video stream.

5. The method of claim 1, where retrieving the first additional content includes:
    associating an address with the first one of the plurality of data scroll items; and
    retrieving the first additional content using the address.

6. The method of claim 1, where retrieving the first additional content includes:
    associating an Internet feed with the first one of the plurality of data scroll items; and
    retrieving the first additional content using the Internet feed.

7. The method of claim 1,
    further comprising:
        determining whether a period of time has expired since providing the first additional content for display; and
        automatically returning to providing the video content for display, without the first additional content, after expiration of the period of time.

8. The method of claim 1,
    where the video content is associated with a video broadcast, and
    where the method further comprises at least one of:
        returning, after providing the first additional content for display, to providing the video content for display at a last position within the video broadcast that was provided prior to providing the first additional content; or returning, after providing the first additional content for display, to providing the video content for display at a pre-selected position within the video broadcast.

9. The method of claim 1,
where the first additional content includes advertisement information associated with a particular product or service, and
where the method further comprises:
   determining that a purchase has occurred in connection with the particular product or service; and
   returning to providing the video content for display upon determining that the purchase has occurred.

10. A device, comprising:
a receiver to receive video content; and
a processor to:
   present the video content on a video display device,
   present a data scroll on the video display device concurrently with the video content,
      the data scroll including a plurality of data scroll items that are consecutively presented horizontally or vertically on the video display device,
         each of the plurality of data scroll items including information identifying a particular topic of a respective additional content,
         each of the plurality of data scroll items, presented on the video display device, including an icon identifying a different one of a plurality of softkeys on a remote control,
         a background color of each of the plurality of data scroll items, displayed on the video display device, being different and matching a color of a corresponding softkey of the plurality of softkeys of the remote control,
   associate a first softkey, of the plurality of softkeys, with a first one of the plurality of data scroll items,
      the background color of the first one of the plurality of data scroll items matching a color of the first softkey,
      the first one of the plurality of data scroll items including:
         information identifying the particular topic, of a first additional content, identified by the first one of the plurality of data scroll items,
         a first icon identifying the first softkey,
         a second icon identifying a type of content of the first additional content of the particular topic identified by the first one of the plurality of data scroll items, the second icon being different than the first icon,
   associate a second softkey, of the plurality of softkeys, with a second one of the plurality of data scroll items,
      the second softkey being different than the first softkey,
         the background color of the second one of the plurality of data scroll items matching a color of the second softkey,
      the second one of the plurality of data scroll items including:
         information identifying the particular topic, of a second additional content different than the first additional content, identified by the second one of the plurality of data scroll items, and
         a third icon identifying the second softkey, the third icon being different than the first icon and the second icon,
   detect selection of the first softkey corresponding to the first one of the plurality of data scroll items or selection of the second softkey corresponding to the second one of the plurality of data scroll items,
   selectively obtain:
      the first additional content when the selection of the first softkey is detected, or
      the second additional content when the selection of the second softkey is obtained, and
   selectively present the first additional content or the second additional content on the video display device,
      when selectively presenting the first additional content or the second additional content, the processor is to:
         present, without the video content, the first additional content on the video display device with at least a third one of the plurality of data scroll items, or
         present, without the video content, the second additional content on the video display device with the at least a third one of the plurality of data scroll items.

11. The device of claim 10, where a shape, of the first icon, matches a shape of the first softkey, and
where a shape, of the third icon, matches a shape of the second softkey,
   the shape of the second softkey being different than the shape of the first softkey.

12. The device of claim 11, where the second icon indicates that the type of content, of the first additional content, corresponds to text content.

13. The device of claim 10, where the processor is further to:
   obtain the video content from the receiver, and
   overlay the data scroll on the video content.

14. The device of claim 10, where the video content is associated with a particular channel of a video stream, and
where, when obtaining the first additional content, the processor is to:
   associate content on another channel of the video stream with the first one of the plurality of data scroll items, and
   change to the other channel to retrieve the first additional content.

15. The device of claim 10, where the processor is further to:
   receive, after presenting the first additional content, an instruction to return to the video content, and
   return to presenting the video content on the video display device based on receiving the instruction.

16. The device of claim 10, where the video content is associated with a video broadcast; and
where the processor is further to return, after presenting the first additional content, to presenting the video content, on the video display device, at a current position within the video broadcast.

17. A non-transitory computer readable medium storing instructions, the instructions comprising:
   one or more instructions which, when executed by one or more processors, cause the one or more processors to receive a video stream,
      the video stream including video content and a data scroll,
         the data scroll including a plurality of data scroll items, each of the plurality of data scroll items including
information identifying a particular topic of a
respective additional content,
a background color of each of the plurality of data
scroll items, displayed on the video display
device, being different and matching a color of a
corresponding softkey of a plurality of softkeys
of a remote control;
one or more instructions which, when executed by the one
or more processors, cause the one or more processors to
provide the video content and the data scroll for display
simultaneously on a video display device,
a first data scroll item, of the plurality of data scroll
items, including:
information identifying the particular topic, of a first
additional content, identified by the first data scroll
item,
a first icon identifying a first one of the plurality of
softkeys, and
a second icon, different than the first icon, identifying
a type of content of the first additional content,
the background color of the first data scroll item
matching a color of the first one of the plurality of
softkeys, and
a second data scroll item, of the plurality of data scroll
items, including:
information identifying the particular topic, of a second additional content different than the first additional content, identified by the second data scroll
item, and
a third icon identifying a second one of the plurality of
softkeys,
the second one of the plurality of softkeys being
different than the first one of the plurality of
softkeys,
the third icon being different than the first icon and
the second icon,
the background color of the second data scroll item
matching a color of the second one of the plurality of softkeys;
one or more instructions which, when executed by the one
or more processors, cause the one or more processors to
associate the first one of the plurality of softkeys with the
first data scroll item;
one or more instructions which, when executed by the one
or more processors, cause the one or more processors to
associate the second one of the plurality of softkeys with
the second data scroll item;
one or more instructions which, when executed by the one
or more processors, cause the one or more processors to
detect selection of the first one of the plurality of softkeys corresponding to the first data scroll item or selection of the second one of the plurality of softkeys corresponding to the second data scroll item;
one or more instructions which, when executed by the one
or more processors, cause the one or more processors to
selectively extract:
the first additional content, from the video stream, when
the selection of the first one of the plurality of softkeys
is detected, or
the second additional content, from the video stream,
when the selection of the second one of the plurality of
softkeys is detected; and
one or more instructions which, when executed by the one
or more processors, cause the one or more processors to
selectively provide the first additional content or the
second additional content, for display on the video display device, with one or more of the plurality of data
scroll items,
the one or more instructions to selectively provide the
first additional content or the second additional content include:
one or more instructions to provide, without the video
content, the first additional content on the video
display device with at least a third one of the plurality of data scroll items, or
one or more instructions to provide, without the video
content, the second additional content on the video
display device with the at least a third one of the
plurality of data scroll items.

18. A method, comprising:
presenting, by a network device, television content with a
data scroll on a video display device to a user,
the data scroll including a plurality of data scroll items
that are consecutively presented on the video display
device,
each of the data scroll items including different advertisement information identifying a respective particular product or service,
a background color of each of the plurality of data
scroll items, displayed on the video display device,
being different and matching a color of a corresponding softkey of a plurality of softkeys of a
remote control;
detecting, by the network device, selection of a first softkey, of the plurality of softkeys, corresponding to a first
data scroll item of the plurality of data scroll items or
selection of a second softkey, of the plurality of softkeys,
corresponding to a second data scroll item of the plurality of data scroll items,
the second softkey being different than the first softkey,
the background color of the first data scroll item
matching a color of the first softkey,
the background color of the second data scroll item
matching a color of the second softkey,
the first data scroll item including:
first advertisement information identifying a first
additional advertisement content for a first particular product or service identified by the first advertisement information, and
an icon identifying the first softkey, and the second
data scroll item including:
second advertisement information identifying a second additional advertisement content for a second
particular product or service identified by the second advertisement information,
the second advertisement additional content being
different than the first additional advertisement
content,
the second particular product or service being different than the first particular product or service,
and
an icon identifying the second softkey;
selectively retrieving by the network device:
the first additional advertisement content when the
selection of the first softkey is detected, or;
the second additional advertisement content when the
selection of the second softkey is detected; and
selectively presenting, by the network device, the first
additional advertisement content or the second additional advertisement content on the video display
device, selectively presenting the first additional content or the second additional content including:
  presenting, without the television content, the first additional advertisement content on the video display device with at least a third one of the plurality of data scroll items, or
  presenting, without the television content, the second additional advertisement content on the video display device with the at least a third one of the plurality of data scroll items.

19. The method of claim 18,
further comprising:
determining that a purchase has occurred in connection with the first particular product or service associated with the first data scroll item; and
automatically returning to presenting the television content, without further presenting the first additional advertisement content, upon determining that the purchase has occurred.

20. The method of claim 18, where the television content is associated with a particular channel of a video stream; and
where selectively retrieving the first additional advertisement content or the second additional advertisement content includes:
  associating content on another channel of the video stream with the first data scroll item, and
  automatically changing to the other channel to retrieve the first additional advertisement content.

21. The method of claim 18, where the first advertisement information or the second advertisement information is based on at least one of:
  information identifying one or more advertisement preferences of the user, or
  information identifying behavior of the user, with respect to advertisements, over a period of time, and
  where the first particular product or service, associated with the first data scroll item, corresponds to a product or service currently presented within the television content.

22. The non-transitory computer readable medium of claim 17, where the second data scroll item further includes a fourth icon that identifies a type of content of the second additional content,
  where the fourth icon is different than the first icon, the second icon, and the third icon, and
  where the type of content, of the first additional content, is different than the type of content of the second additional content.

23. The non-transitory computer readable medium of claim 22, where the second icon indicates that the type of content, of the first additional content, corresponds to one of text content or video content, and
  where the fourth icon indicates that the type of content, of the second additional content, corresponds to a different one of the text content or the video content.

24. The non-transitory computer readable medium of claim 17, where the first additional content and the second additional content include news content, and
  where the second icon indicates that the type of content, of the first additional content, corresponds to text content.

* * * * *